United States Patent [19]

Tuomaala

[11] Patent Number: 4,885,968
[45] Date of Patent: Dec. 12, 1989

[54] MOUNTING OF THE CIRCULARLY FITTED INSERTED TOOTH OF A CIRCULAR SAW

[75] Inventor: Jorma A. K. Tuomaala, Oulu, Finland

[73] Assignee: Teratoute Oy, Toijala, Finland

[21] Appl. No.: 508,088

[22] Filed: Jun. 27, 1983

[30] Foreign Application Priority Data

Mar. 17, 1983 [FI] Finland ................................. 830882

[51] Int. Cl.$^4$ ............................................. B27B 33/12
[52] U.S. Cl. ........................................ 83/843; 83/839
[58] Field of Search ................. 83/835, 839, 840, 844, 83/845, 843; 407/49, 50, 91, 47, 48, 103, 109, 110

[56] References Cited

U.S. PATENT DOCUMENTS

| 306,967 | 10/1884 | Simonds | 83/840 |
| 311,301 | 1/1885 | Emerson | 83/841 |
| 368,999 | 8/1887 | Emerson | 83/841 |
| 488,336 | 12/1892 | Kendall | 83/845 |
| 3,071,027 | 1/1963 | Hiltebrand | 83/845 |

FOREIGN PATENT DOCUMENTS 625286  8/1961  Canada ................................. 83/839

Primary Examiner—Hien H. Phan
Attorney, Agent, or Firm—Patrick F. Henry, Sr.

[57] ABSTRACT

Mounting of the circularly fitted inserted tooth of a circular saw. An inserted tooth (4) having a circular mounting surface is mounted on a blade body (1) and into a round-bottomed notch whose opposite edges are parallel. Tooth (4) is locked in the notch by means of a rivet (6) which is positioned in a juncture between the removable tooth and the blade body along a straight portion of the edge of a notch. Such locking facilitates a strong design for said tooth and even a loose tooth can be re-tightened in position by means of the flattening pressure of said rivet.

2 Claims, 1 Drawing Sheet

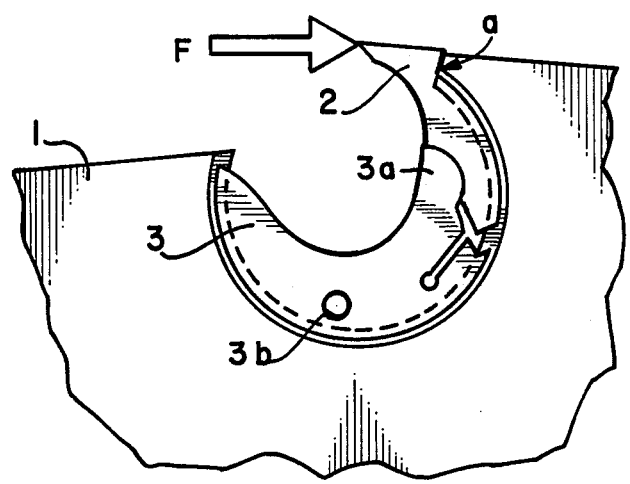
Prior Practice  FIG. 1
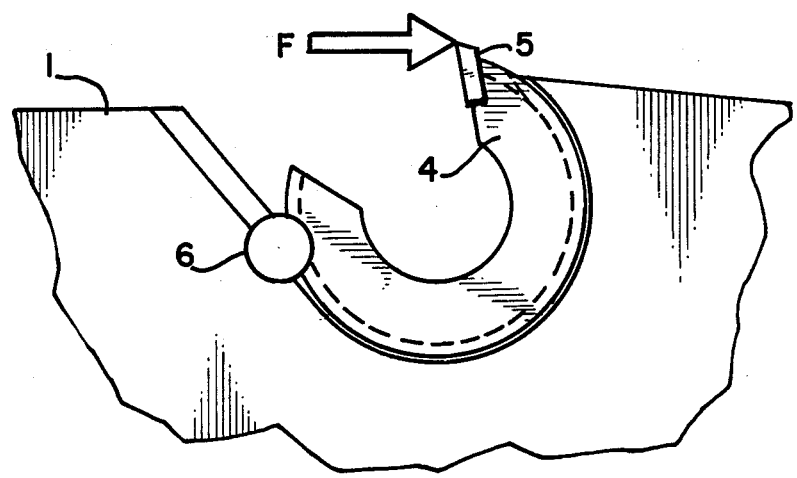
FIG. 2

MOUNTING OF THE CIRCULARLY FITTED INSERTED TOOTH OF A CIRCULAR SAW

The large size circular saw blades intended for ripping logs have for decades been fitted with an inserted tooth. as shown in FIG. 1. Characteristic for it is that the V-shaped recess or notch formed on the rim of a blade is a partial circle whose central angle is clearly more than 180°. Fitted in this notch is an inserted tooth 2 whose fitting surface is likewise V-shaped. The tooth bears upon the edge point of said notch at a in a manner that shearing force F is not capable of moving it in its V-groove along the inner edge of said notch.

The notch is also provided with a locking piece 3 whose V-shaped rim fits well on the edge of a notch. The locking piece is provided with a notched resilient cam 3a which presses tooth 2 tightly against the edge of said notch. Mounting of cam 3a on tooth 2 is such that, as the edge point of a notch prevents the tooth from turning clockwise in the figure, turning of the locking piece in this direction is also prevented. Counterclockwise turning is allowed, whereby the tooth and the locking pice are turning together. Due to the stress produced by cam 3a, this requires a robust tool engaged with the inner surface of said locking piece and in a hole 3b. As the counterclockwise turning proceeds, said tooth 2 finally disengages and can be replaced by a new one. By turning it clockwise by means of the same tool it is locked in position against the edge point a. As the circular contact surface of said notch extends beyond a semi-circle, the radial ejection of tooth and locking piece is prevented.

There are certain limitations to the use and manufacturing of this tooth. Resilience of a cam is quite limited since only a part of the locking piece material is available for such resilient action. The actual tooth is small and the dimensions of its bearing surfaces are small. Thus, it is not capable of sustaining major tearing forces in a cut-off saw but its use is limited to ripping of fresh wood. A circular notch on the rim of a blade must be machined from both sides of a blade.

Therefore, it is very difficult to make its diameter dimension to sufficient accuracy. Also difficult is to locate the rim edge in the middle of a blade. On the other hand, high precision or accuracy would be necessary for the hole because of the limited resilience of a cam and the lack of tightening possibilities of the mounting.

An object of this invention is to design a tooth, a tooth notch and locking in such a manner that said tooth is able to withstand the stresses even in cut-off saws. The design is also aimed at reduction of manufacturing costs even at minor production rates. The accuracy requirements in the manufacturing can be moderated and, on the other hand, the mode of manufacturing can be modified so that high accuracy would not be difficult to achieve.

The configuration of a tooth notch is V-shaped, FIG. 2. The sides of a notch are parallel and its bottom is round. Thus, a notch can be machined by feeding in the cutter from the side of a blade. The teeth of a cutter are set in a manner that the notch will be ready by a single feed motion. When using one and the same tool, all notches of a blade will be very accurately similar to each other without having to pay any attention to this machining operation.

A tooth 4 is designed as a circular ring, with part of its periphery being removed. The outer rim of tooth 4 is suitably V-shaped to fit in the notch V-groove. The V-groove can be made by lathing and its diameter is toleranced so that the fitting will be tight. The corner of a tooth is provided with a cutting point 5. When it is jammed in position, the entire body of a tooth is forced to bend to a smaller diameter. Thus, the tightening resilience is substantial and also the tightening force will be great. The angle of working contact between the arc of the rim of tooth 4 and corresponding arc of the V-groove is about 180° of arc or less.

The tooth is locked in position by means of rivet 6. It is positioned on the edge of a tooth notch along the straight section. This is to close the otherwise open notch and the tooth cannot eject out of it. The rivet also prevents a shearing force F from turning the tooth. As a supporting reaction, the shearing force F leads to even more vigorous pressing of a tooth against the edge of a notch. The flattening pressure of a rivet can be used to re-tighten even a loose tooth back into position.

I claim:
1. In the mounting of a saw tooth which is inserted on a saw blade:
   an arcuate tooth,
   a saw blade body having a blade edge,
   a tooth notch leading from said blade edge into said saw blade body, said tooth notch having a semi-circular round bottom with opposed straight parallel sides leading from said blade edge and said tooth being fitted under compression in the semi-circular round bottom of said notch on said blade body, there being a juncture between one of the straight parallel sides the tooth and the round bottom of the notch,
   and a rivet positioned at said juncture of the tooth and the blade body on the one of the straight parallel sides of said notch.

2. The arrangement set forth in claim 1, wherein there is an arc of working contact between the semi-circular bottom of the notch on the blade body and the tooth of about 180° approximately and said locking rivet being located at least partly outside of said arc of working contact.

* * * * *